United States Patent
Takano (10) Patent No.: US 7,225,705 B2
(45) Date of Patent: Jun. 5, 2007

(54) POWER TRANSMISSION DEVICE AND ASSEMBLING METHOD FOR A MOTORCYCLE

(75) Inventor: Yoshihide Takano, Shizuoka-ken (JP)

(73) Assignee: Yamaha Motor Co., Ltd, Shizuoka-ken (JP)

( * ) Notice: Subject to any disclaimer, the term of this patent is extended or adjusted under 35 U.S.C. 154(b) by 240 days.

(21) Appl. No.: 11/081,794

(22) Filed: Mar. 16, 2005

(65) Prior Publication Data

US 2005/0204863 A1 Sep. 22, 2005

(30) Foreign Application Priority Data

Mar. 16, 2004 (JP) .............................. 2004-075419

(51) Int. Cl.
F16H 57/02 (2006.01)
F16H 57/04 (2006.01)
F16H 61/00 (2006.01)
B60K 17/00 (2006.01)

(52) U.S. Cl. .................................... 74/606 R; 180/344
(58) Field of Classification Search ............. 74/606 R; 180/344, 377
See application file for complete search history.

(56) References Cited

U.S. PATENT DOCUMENTS 6,216,659 B1 * 4/2001 Takegami et al. ........ 123/193.5
6,364,797 B1 * 4/2002 Ikusue et al. ............... 474/148

FOREIGN PATENT DOCUMENTS

JP 2000-130254 5/2000

* cited by examiner

Primary Examiner—Tisha Lewis
(74) Attorney, Agent, or Firm—Knobbe, Martens, Olson & Bear LLP (57) ABSTRACT

A power transmission device includes a drive shaft, one end of which extends beyond a drive-side transmission case, a drive wheel mounted onto the one end of the drive shaft, a driven wheel journaled by a driven-side transmission case that is mounted onto the driven-side transmission case, and a cover member. The cover member is mounted on the driven-side transmission case and covers one end of the drive shaft, the drive wheel and the driven wheel from a location on an outer side of the transmission case. A regulating member is provided to regulate movement of the drive wheel in an axial direction relative to the driven-side transmission case. The regulating member and the cover member are each in separate abutment with corresponding abutment surfaces the driven-side transmission case. The abutment surfaces of the transmission case are substantially coplanar with each other.

14 Claims, 6 Drawing Sheets

POWER TRANSMISSION DEVICE AND ASSEMBLING METHOD FOR A MOTORCYCLE

PRIORITY INFORMATION

This application is based on and claims priority to Japanese Patent Application No. 2004-075419, filed Mar. 16, 2004, the entire contents of which is hereby expressly incorporated by reference.

BACKGROUND OF THE INVENTION

1. Field of the Invention

The present invention relates to a power transmission device in which a transmission case includes a drive-side transmission case and a driven-side transmission case mounted onto the drive-side transmission case, and a method for assembling the power transmission device. The power transmission device and the associated assemble method have particular utility when employed with a motorcycle or a similar vehicle.

2. Description of the Related Art

Prior motorcycles have included transmissions with split transmission cases. Japanese Patent Publication No, 2000-130254 discloses an example of such a transmission. The disclosed transmission includes a drive shaft journaled by a drive-side transmission case such that one end of the drive shaft extends beyond the drive-side transmission case and is coupled with an internal combustion engine that generates power for traveling. A drive wheel is mounted onto the one end of the drive shaft. A driven-side transmission case is mounted onto the drive-side transmission case, and a driven wheel is journaled by the driven-side transmission case so as to be coupled with the drive wheel through a belt. The driven wheel is also drivingly coupled with a rear wheel of the motorcycle. A cover encloses the drive and driven wheels and the belt within the transmission cases.

Upon operation of the internal combustion engine, the power thereof is transmitted to the rear wheel through the drive shaft, the drive wheel, the driven wheel and the like, with the speed reduced. The driven rear wheel propels the motorcycle.

The above-described power transmission device is assembled in, for example, the following method. First, the drive-side transmission case is assembled. Specifically, for example, the drive shaft is assembled with the drive-side transmission case. Second, the drive wheel is temporarily placed onto the driven-side transmission case, and the endless member is wrapped around the drive wheel and the driven wheel. Third, the driven-side transmission case is mounted onto the drive-side transmission case, and the drive wheel is mounted onto the one end of the drive shaft. Finally, the cover member is mounted onto the driven-side transmission case to complete the assembly processes of the power transmission device.

As the conventional assembly methods has thus been described, the drive wheel is mounted onto the one end of the drive shaft as one of the last steps in the process; however, before this step, the drive wheel has been temporarily placed onto the driven-side transmission case. Because of this temporary setting, the drive wheel often unintentionally slips relative to or off from the driven-side transmission case. When this occurs, the assembly process becomes more complicated and difficult.

SUMMARY OF THE INVENTION

An aspect of the present invention involves providing a regulating member that is positioned by approaching an outside surface of the drive wheel from a location outward of the one end in an axial direction of the drive shaft to be mounted onto the driven-side transmission case. The regulating member restricts an axial movement of the drive wheel relative to the driven-side transmission case. The regulating member can be mounted onto the driven-side transmission case that journals the driven wheel. At this time, the drive wheel is simply positioned so as to be interposed between the outside surface of the driven-side transmission case and the regulating member in the axial direction of the drive shaft. In this manner, the drive wheel is positioned at a predetermined location that is generally on an axis of the drive shaft, and the drive wheel is inhibited from unintentionally slipping from the predetermined location on the side of the driven-side transmission case. Thus, the power transmission device can be easily assembled because little or no attention needs to be paid to the position of the drive wheel.

It is recognized, however, that a regulating member can complication rather than simplify the fabrication of the power transmission device. If an inside surface of the regulating member abuts the driven-side transmission case, while the cover member abuts an outside surface of the regulating member, such that these components are coupled with each other, the inside and outside surfaces of the regulating member that abut the driven-side transmission case and the cover member, respectively, need to be machined. Such machining is troublesome and is likely to make the production of the power transmission device more expensive. An aspect of the present invention is thus made in view of the above-mentioned circumstances and aims to facilitate the assembly and formation of a power transmission device.

A power transmission device is thus provided that comprises a drive-side transmission case and a drive shaft that is journaled by the drive-side transmission case such that one end of the drive shaft extends beyond the drive-side transmission case. A drive wheel is mounted onto the one end of the drive shaft. A driven-side transmission case is mounted onto the drive-side transmission case and includes substantially coplanar first and second abutment surfaces. The driven-side transmission case also journals a driven wheel that is arranged to be coupled with the drive wheel. A cover member is mounted onto the driven-side transmission case and covers the one end of the drive shaft, the drive wheel and the driven wheel from a location on an outer side of the driven-side transmission case. A regulating member is positioned to lie on an outer side surface of the drive wheel and is mounted onto the driven-side transmission case. The regulating member is configured to restrict at least axial movement of the drive wheel relative to the driven-side transmission case.

In accordance with a further aspect of the present invention, the driven-side transmission case includes first and second abutment surfaces. These surfaces are substantially coplanar with each other to ease the fabrication of the driven-side transmission case. The cover member is juxtaposed to at least the first abutment surface when mounted onto the driven-side transmission case and the regulating member is juxtaposed to at least the second abutment surface when it is mounted onto the drive-side transmission case.

In accordance with an additional aspect of the present invention, a method of assembling a power transmission device is provided. The method comprises the steps of coupling a drive-side transmission case with a portion of a drive shaft such that an end of the drive shaft extends beyond an outer side of the drive-side transmission case, and positioning a drive wheel on a driven-side transmission case. A driven wheel is coupled together with the driven-side transmission case in a manner journaling the driven wheel. A regulating member is mounted onto the driven-side transmission case so that the drive wheel is interposed between the driven-side transmission case and the regulating member, with the regulating member restricting movement of the drive wheel at least in the axial direction of the drive shaft. The driven-side transmission case is mounted onto the drive-side transmission case while the drive wheel is positioned on the one end of the drive shaft. The cover is then attached onto the driven-side transmission case.

BRIEF DESCRIPTION OF THE DRAWINGS

These and other features, aspects and advantages of the present invention will be better understood with reference to a preferred embodiment, which is illustrated in the accompanying drawings. The illustrated embodiment is merely exemplary and is not intended to define the outer limits of the scope of the present invention. The drawings of the illustrated arrangement comprise six figures.

FIGS. 1, 3 and 4 are several views of a power transmission device configured in accordance with a preferred embodiment of the present invention.

FIG. 1 is a side view of a motorcycle that can employ the power transmission device illustrated in FIGS. 2, 3 and 4.

DETAILED DESCRIPTION OF THE PREFERRED EMBODIMENT

Figure 2:
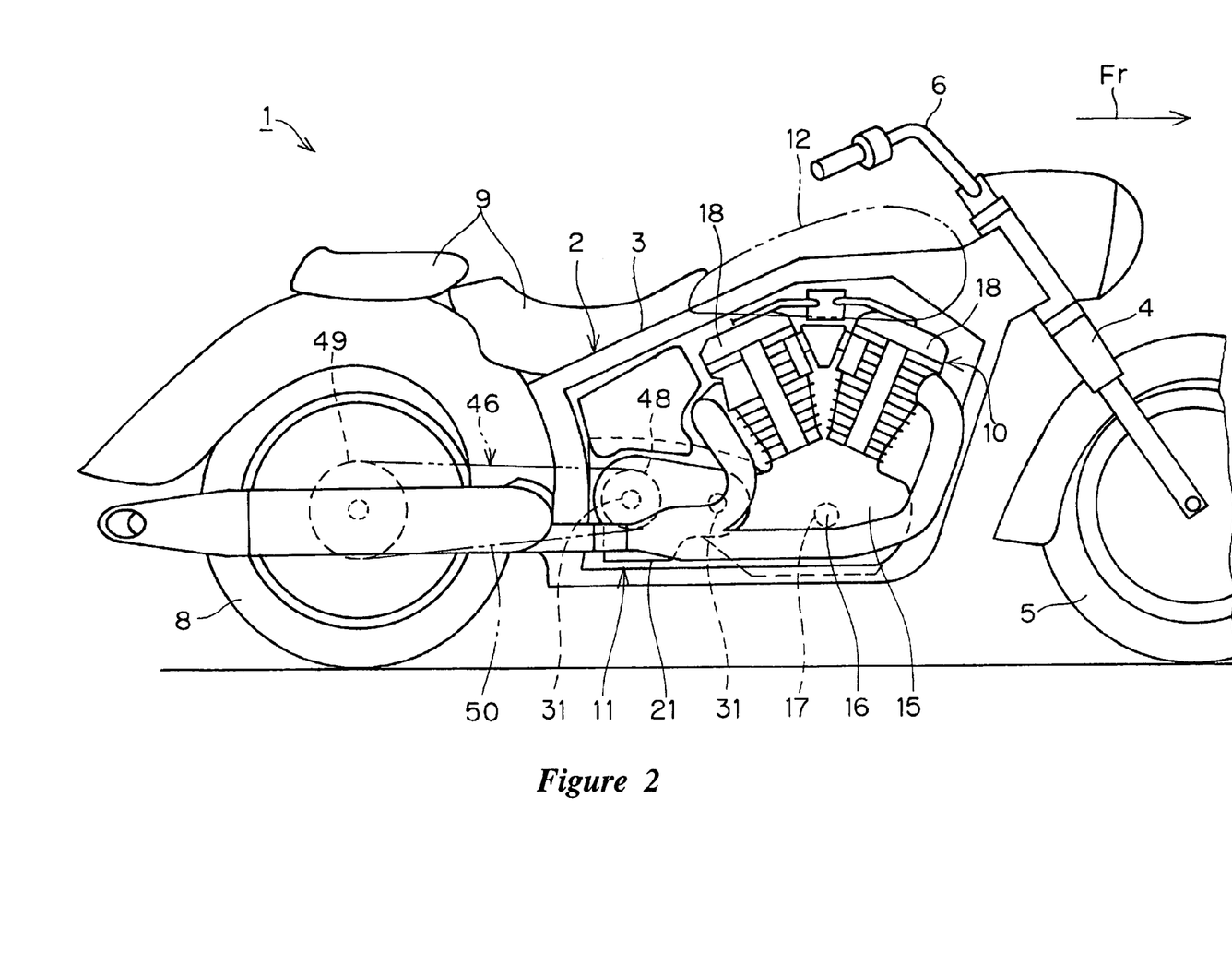

The present invention involves an improved design that eases the assembly and formation of a power transmission device on a powered article. The present power transmission device has particularly utility with wheeled vehicles (e.g., other straddle-type vehicles, such as, for example, a motorcycle, a scooter, or an ATV), as well as with other vehicles (snowmobiles, personal watercraft) or stationary articles driven by a prime mover (e.g., an internal combustion engine). In the illustrated embodiment, as seen in FIG. 2, the present power transmission is described as employed on a motorcycle, indicated generally by reference numeral 1. Also, the reference symbol Fr indicates a forward direction of the vehicle 1 into which the vehicle 1 can travel.

In describing the present power transmission device and the motorcycle 1 in general, various components thereof will be described using the following and similar terms: front, forward, back, rearward, inside, inner, outer side, and outer. These terms are used relative to the motorcycle with inner being towards a center point of the motorcycle body and forward being in the direction that the motorcycle faces (Fr), and rearward and outer being in opposite directions, respectively.

A vehicle body 2 of the vehicle 1 includes a body frame 3, a front fork 4 that is pivotally supported by the body frame 3 at its front end, and a front wheel 5 supported by the front fork 4 at its bottom end. The front fork 4 also supports handlebars 6 at its top end. In the illustrated embodiment, a rear arm pivotally is supported by the body frame 3 at its end portion, and a rear wheel 8 is supported by the rear arm near its free end. The body frame 3 also supports a seat 9 on its upper side and an internal combustion engine 10 that is disposed within the body frame 3 to be a motive power source of the vehicle 1. The present embodiment of the power transmission device is indicated generally by reference number 11 and operates to connect the rear wheel 8 with the engine 10. A fuel tank 12 is disposed on the frame 3 forward of the seat 9 and supplies fuel to the engine 10.

The engine 10 preferably is a four-stroke engine of the overhead valve (OHV) type. The engine 10 includes a crankcase 15 supported by the body frame 3, a crankshaft 17 having an axis 16 extending transversely of the vehicle 1 and journaled by the crankcase 15 for rotation about the axis 16, and front and rear cylinders 18, 18 extending upward from the crankshaft 17. The illustrated engine, however, is merely an example and other types of engines or prime movers can be used as well. For example, the engine can have a different valve drive mechanism, can operate on a different combustion principle, and/or can have a different number of cylinders and cylinder configuration.

With reference to FIGS. 1–4, the power transmission device 11 includes a transmission case 21 that preferably is made of aluminum cast material and is supported by the body frame 3. The transmission case 21 includes a drive-side transmission case 22 that is unitarily formed with a rear portion of the crankcase 15 and a driven-side transmission case 23 that is mounted onto a rear portion of the drive-side transmission case 22. One side portion of the driven-side transmission case 23 is detachably affixed to one side portion (right hand side) of the drive-side transmission case 22 by fasteners 24, while the other side of the driven-side transmission case 23 is detachably affixed to the other side portion (left hand side) of the drive-side transmission case 22 by a bracket 25 and fasteners 26. In this manner, the driven-side transmission case 23 is mounted onto the rear portion of the drive-side transmission case 22.

Figure 1:
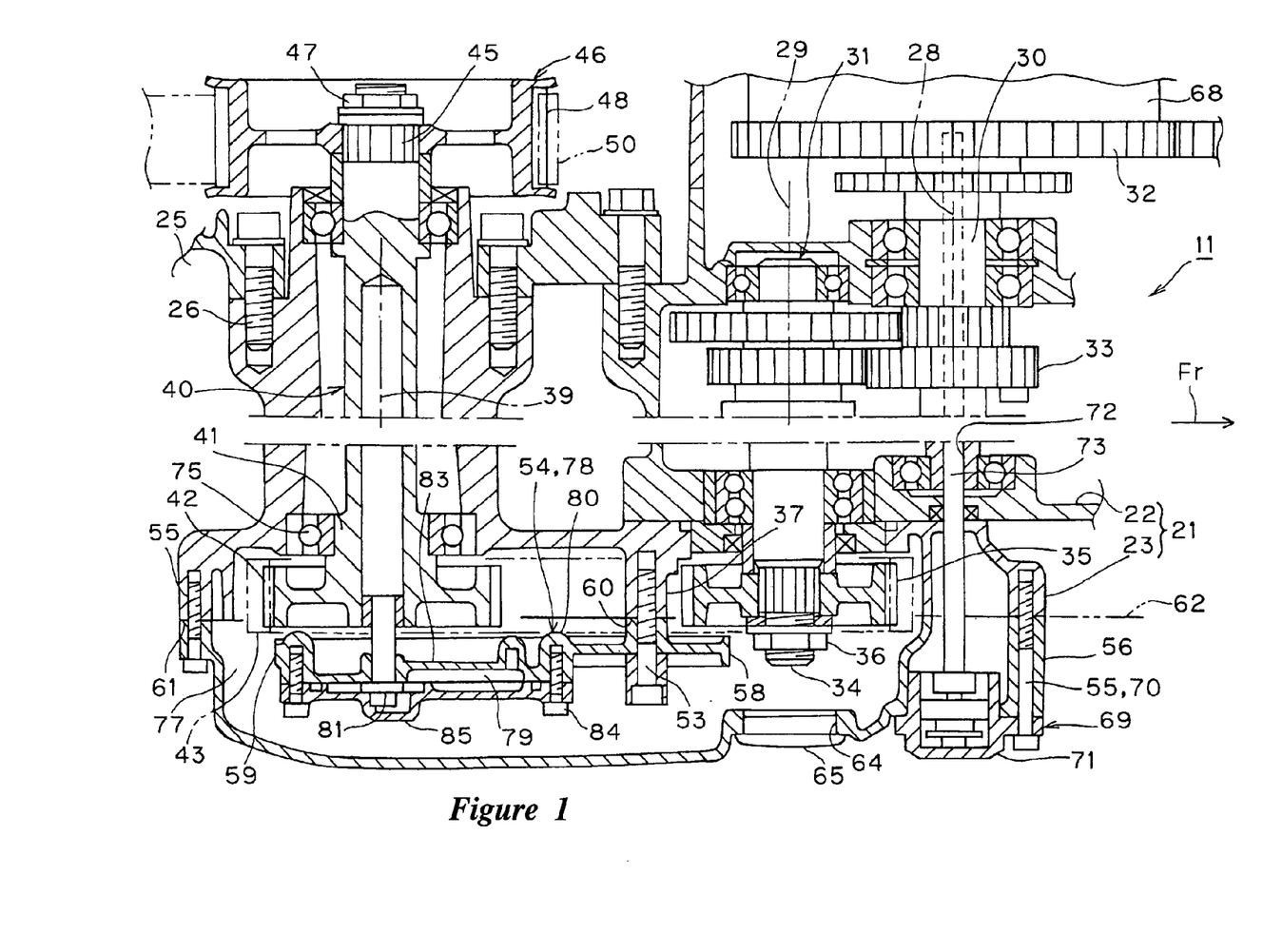
FIG. 1 is a cross-section view of the power transmission device taken along the line 1—1 of FIG. 3.
Figure 3:
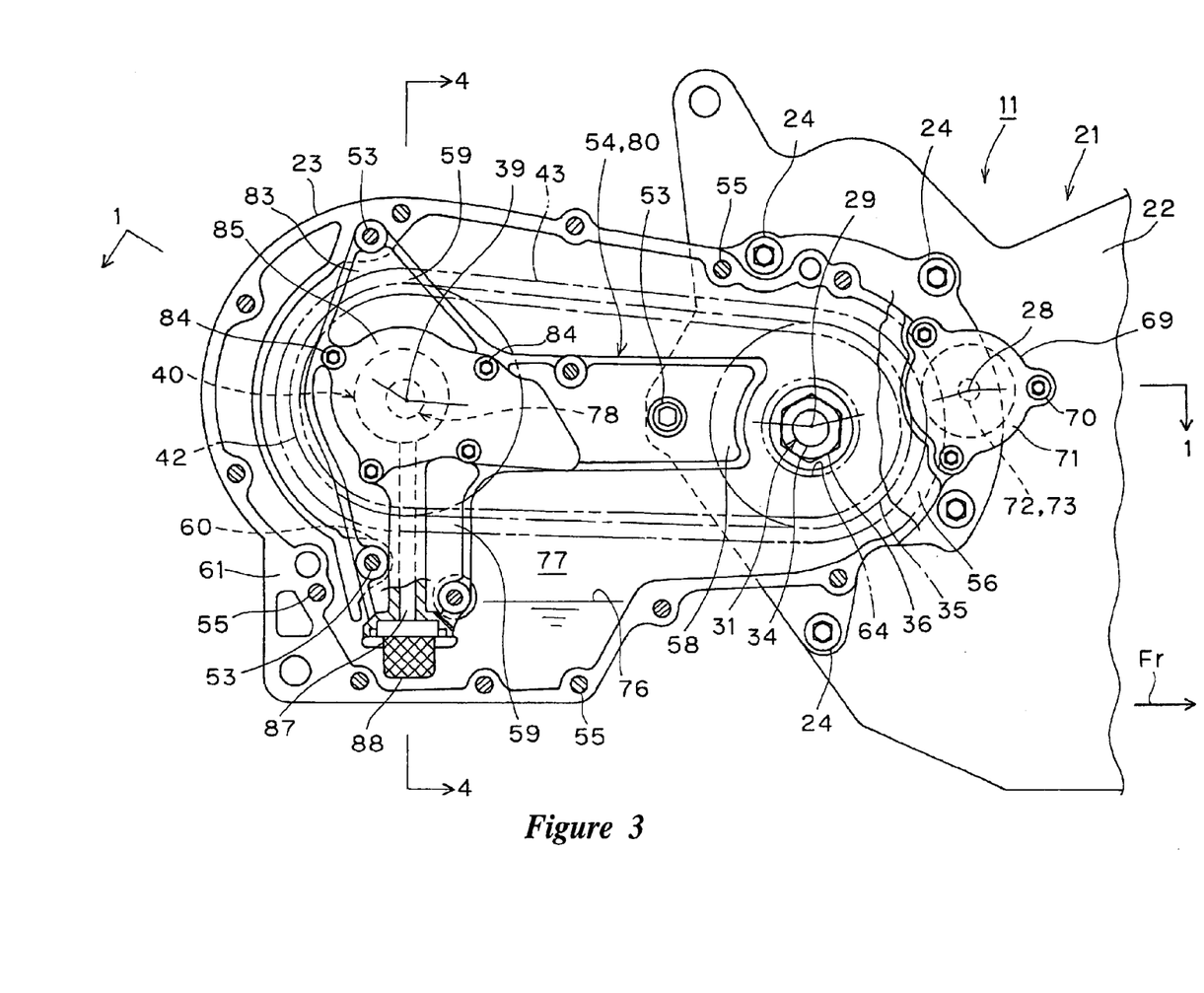
FIG. 3 is a sectional side view of the power transmission device.
Figure 4:
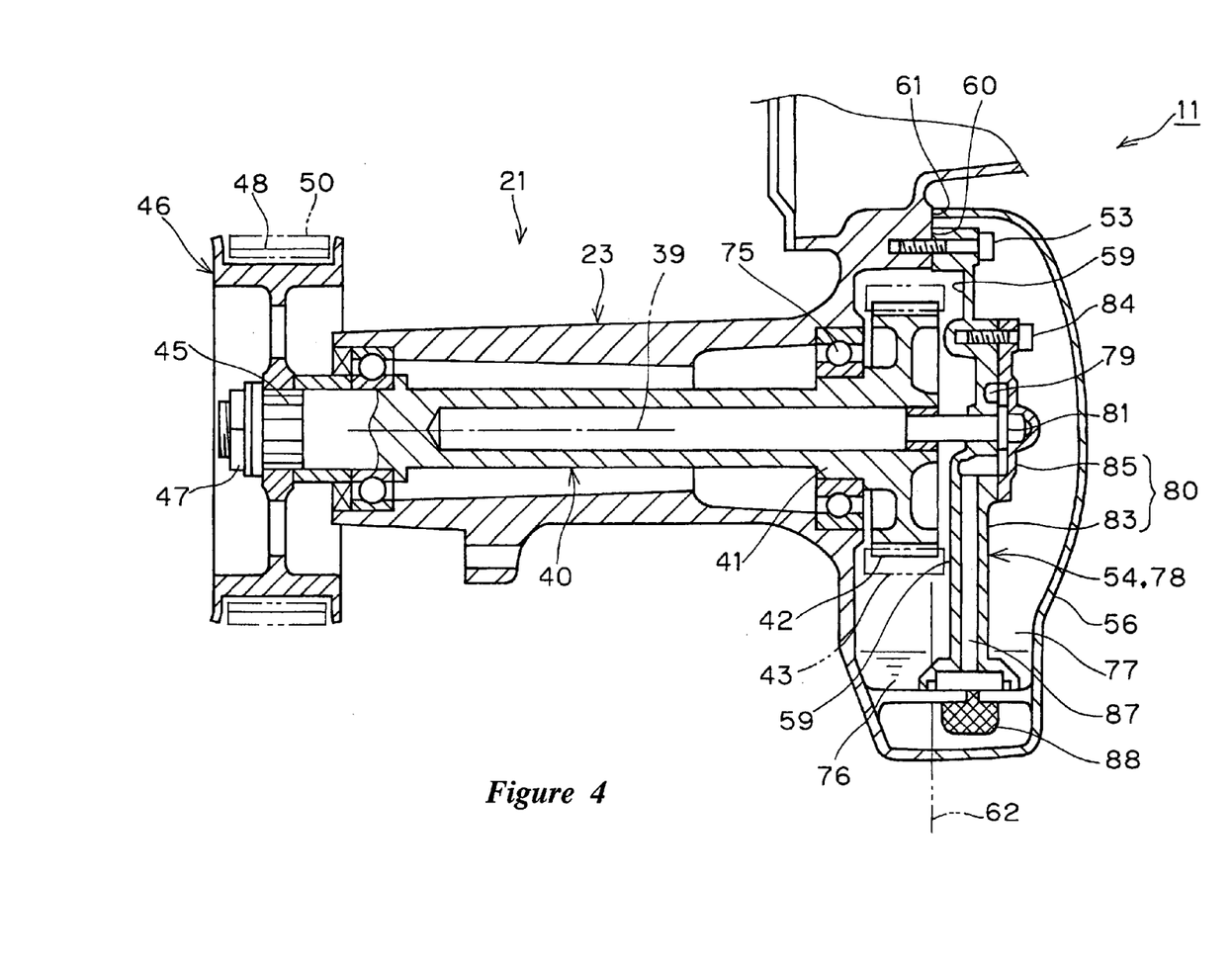
FIG. 4 is an enlarged cross-sectional view of the power transmission device taken along line 4—4 of FIG. 3.

The drive-side transmission case 22 journals an input shaft 30 and a drive shaft 31 as an output shaft such that the shafts 30, 31 are rotatable about axes 28, 29, respectively, that preferably extend parallel to the axis 16 of the crankshaft 17. A drive-side gear unit 32 interlockingly couples the input shaft 30 with the crankshaft 17, while a transmission gear unit 33 interlockingly couples the drive shaft 31 with the input shaft 30.

One end 34 of the drive shaft 31 extends beyond one end (right hand side) of the drive-side transmission case 22, and also extends through a front portion of the driven-side transmission case 23 to project outward of a front portion of the driven-side transmission case 23. The end 34 of the drive shaft 31 carries a drive wheel 35 that is removably coupled therewith by a spline connection. In addition, a fastener 36 detachably affixes the drive wheel 35 to the end 34 of the drive shaft 31.

The rear portion of the driven-side transmission case 23 journals a driven shaft 40 such that the driven shaft 40 is rotatable about an axis 39 that extends generally parallel to the axis 16 of the crankshaft 17. One end 41 of the driven shaft 40 extends beyond one end of the rear portion of the driven-side transmission case 23. A driven wheel 42 is unitarily formed with the end 41 about the axis 39. The driven wheel 42 is positioned to the rear of the drive wheel 35. The drive wheel 35 and the driven wheel 42 preferably are sprocket wheels. An endless member 43 as a power transmission chain is wound around the wheels 35, 42. The endless member 43 couples the driven wheel 42 with the drive wheel 35 such that the driven wheel 42. In the illustrated embodiment, the driven wheel 42 is larger than the drive wheel 35 such that the driven wheel 42 rotates at a slower speed than the drive wheel 35. While in the illustrated embodiment the wheels are sprockets and the endless member is a chain, the wheels can be other rotateable members such as, for example, gears or pulleys in other embodiments, and the endless member can be another type of transmitter, such as, for example a belt (e.g., a cogged belt).

An outside surface of the driven-side transmission case 23 has a recess 37. The drive wheel 35 and a portion of the endless member 43 that is wound around the drive wheel 35 are removably fitted into the recess 37 from a location outward of the one end 34 in the axial direction of the drive shaft 31. The drive wheel 35 and the portion of the endless member 43 are individually positioned adjacent to an outside surface of the driven-side transmission case 23 that defines a bottom surface of the recess 37, in the axial direction of the drive shaft 31. Also, respective outer peripheral areas of the drive wheel 35 and the portion of the endless member 43 are positioned adjacent to an inner surface of the recess 37 around the axis 29. That is, the drive wheel 35 and the portion of the endless member 43 are fitted into the recess 37 such that their respective movements in radial directions are retrained.

The rear wheel 8 is coupled with the other end 45 of the driven shaft 40 through drive mechanism, such as an interlocking device 46. The interlocking device 46 in the illustrated embodiment includes a drive sprocket wheel 48 detachably fixed to the other end 45 of the driven shaft 40 by a fastener 47, a driven sprocket wheel 49 affixed to the rear wheel 8, and an endless chain 50 wound around the drive and driven sprocket wheels 48, 49 for power transmission.

As seen in FIGS. 1 and 3, a regulating member 54 is provided in the power transmission device. The regulating member 54 preferably is made of aluminum cast material and is positioned over (that is, directly to the side of) at least a portion of an outside surface of the drive wheel 35 and at least a portion of an outside surface of the endless member 43 from a location outward of the end 34 in the axial direction of the drive shaft 31. The regulating member 54 is detachably mounted onto the driven-side transmission case 23 by a fastener 53. A cover member 56 is also provided, which also is preferably made of aluminum cast material, and covers the end 34 of the drive shaft 31, the drive wheel 35, the driven wheel 42 and the regulating member 54. The cover member 56 is moved into this position from a location outward of the one end 34 of the drive shaft 31. The cover member 56 is detachably mounted onto the driven-side transmission case 23 by a fastener 55.

One portion 58 of the regulating member 54 directly opposes at least a portion of the outside surface of the drive wheel 35 from a location generally outward of the end 34 of the drive shaft 31, while another portion 59 of the regulating member 54 directly opposes at least a portion of the outside surface of the endless member 43. That is, the drive wheel 35 and the endless member 43 are interposed between the driven-side transmission case 23 and the regulating member 54 such that movements thereof are restricted in the axial direction of the drive shaft 31. Also, in a view along the axis 29 of the drive shaft 31 (FIG. 3), at least a portion 58 of the regulating member 54 is positioned in an area surrounded by the endless member 43.

The regulating member 54 and the cover member 56 are individually in surface abutment with the outside surface of the driven-side transmission case 23. Respective surfaces 60, 61 of the driven-side transmission case 23 abutting on the regulating member 54 and the cover member 56 preferably are defined in one hypothetical flat surface 62; that is, the surfaces 60, 61 are at least substantially coplanar.

In the illustrated embodiment, a portion of the cover member 56, on the axis 29 of the drive shaft 31, has an oil inlet port 64 through which lubricant oil can be introduced. A cap 65, which preferably is made of resin, detachably closes the oil inlet port 64. Additionally, the oil inlet port 64 preferably allows a nut of the fastener 36 to pass therethrough. Another construction in which the nut cannot pass through the port 64 is also practicable.

A clutch 68 is provided to selectively transmit power from the crankshaft 17 to the input shaft 30 of the power transmission device 11. Operating means 69 is provided to connect or disconnect the clutch 68. In the illustrated embodiment, the operating means 69 includes an actuator 71 detachably affixed to the front portion of the cover member 56 by a fastener 70, and an operating rod 73 fitted into an aperture 72 that is defined on the axis 28 of the input shaft 30 so as to be slidable in the axial direction to interlockingly couple the clutch 68 with the actuator 71. The clutch 68 is connected or disconnected when the actuator 71 is indirectly operated through the operating rod 73 by the rider.

A lubrication device is provided to supply lubricant 76 to one or more portions of the power transmission device and/or other components of the motorcycle that require lubrication, such as, for example, a bearing portion 75 that journals the driven shaft 40 on the driven-side transmission case 23. The lubrication device includes an oil pump 78 that can supply the lubricant 76 accumulating in a bottom of a closed space 77 between the driven-side transmission case 23 and the cover member 56 to each portion to be lubricated. In the illustrated embodiment, the oil pump 78 includes a pump case 80 unitarily formed with the regulating member 54 to define a pump chamber 79 inside thereof, and a pump drive section 81 which is a rotor built in the pump chamber 79 and interlockingly coupled with the driven shaft 40 on the driven-wheel side.

The pump case 80 includes a pump case body 83 mounted onto the driven-side transmission case 23 by the fastener 53, and a pump cover 85 that is detachably affixed to a surface of the pump case body 83 on the cover member 56 side by a fastener 84. The pump chamber 79 is defined between the pump case body 83 and the pump cover 85. The pump case 80 defines an oil passage 87 that connects the bottom of the space 77 and the pump chamber 79 with each other. An oil filter 88 is attached to a bottom opening of the oil passage 87. The oil filter 88 preferably is supported by both the driven-side transmission case 23 and the cover member 56.

Figure 5:
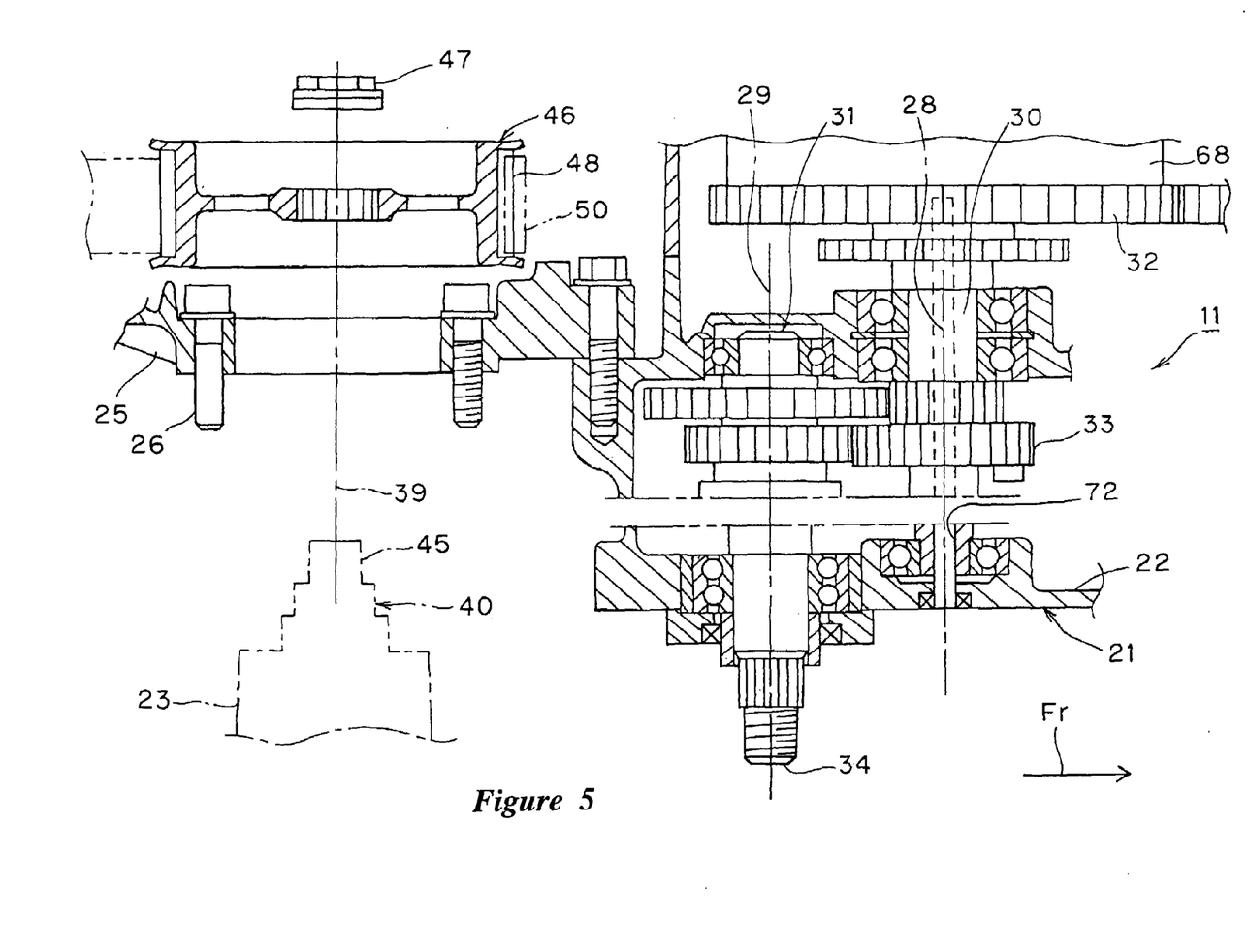
FIG. 5 is a cross-sectional view of a drive-side portion of the power transmission device illustrated in FIG. 1, with a driven-side portion only partially shown in phantom lines.
Figure 6:
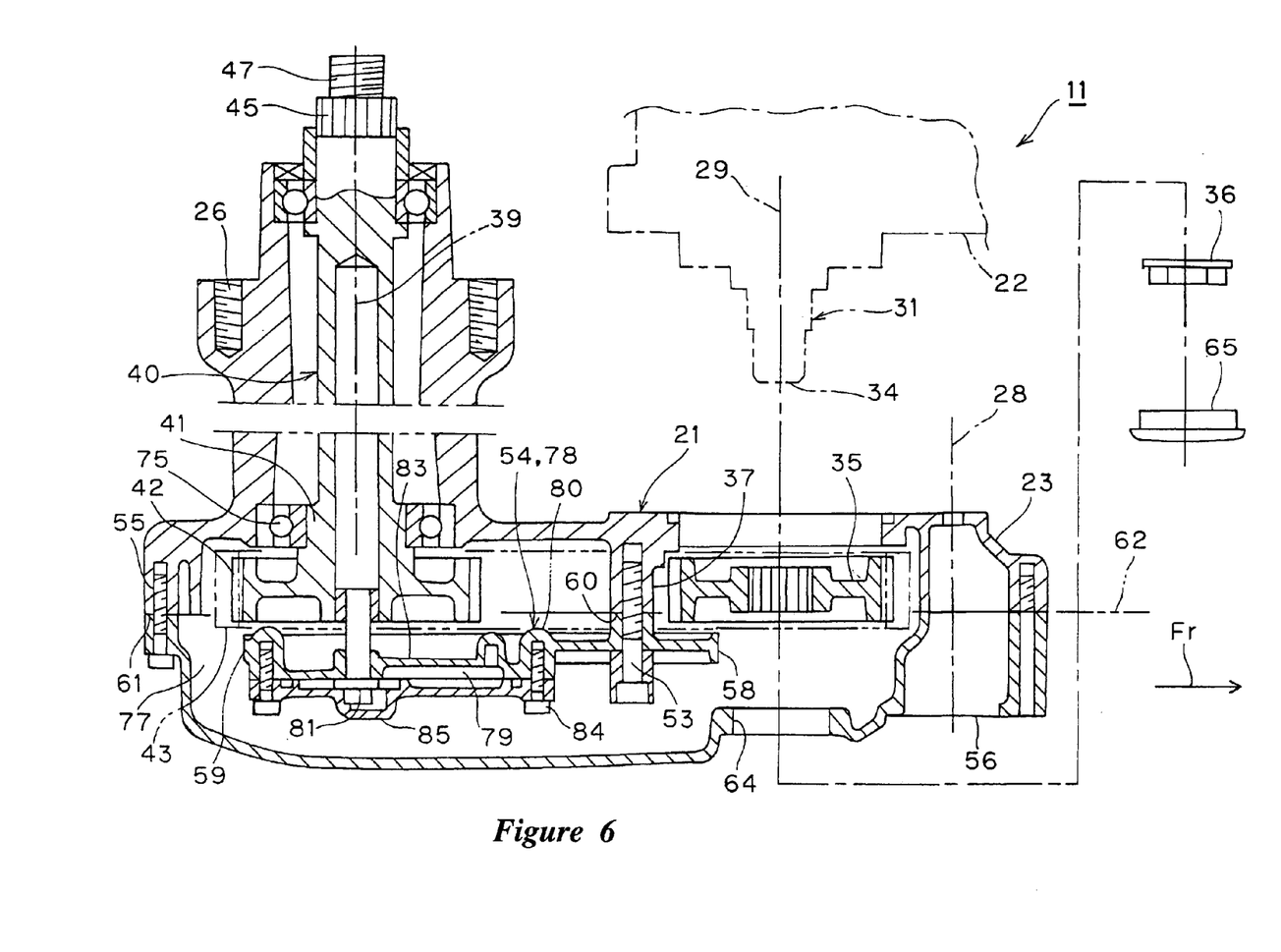
FIG. 6 is a cross-sectional view of the driven-side portion of the power transmission device illustrated in FIG. 1, with the drive-side portion only partially illustrated in phantom lines.

With reference to FIGS. 5 and 6, an assembly work of the power transmission device 11 can be conducted by the following assembly method.

First, the drive-side transmission case 22 preferably is assembled. Specifically, the input shaft 30, the drive shaft 31 and associated components thereof (e.g., bearings) are assembled with the drive-side transmission case 22.

The endless members 43 is then wound around the drive wheel 35 and the driven wheel 42 in the illustrated embodiment. Afterwards, the drive wheel 35 and the portion of the endless member 43 that is wound around the drive wheel 35 are fitted into the recess 37. Next, the regulating member 54 is mounted onto the driven-side transmission case 23 that journals the driven shaft 40 and the driven wheel 42 by the fastener 53. At this time, at least a portion of the drive wheel 35 is positioned so as to be interposed between the outside surface of the driven-side transmission case 23 and the regulating member 54 in the axial direction of the drive shaft 31. Also, at least a portion of the endless member 43 is positioned so as to be interposed between the outside surface of the driven-side transmission case 23 and the regulating member 54 in the axial direction of the drive shaft 31.

Thus, the driven-side transmission case 23 and the regulating member 54 together restrict the respective movements of the drive wheel 35 and the portion of the endless member 43 that is wound around the drive wheel 35 in the axial direction of the drive shaft 31 and in directions radial to the axial direction. That is, the drive wheel 35 is positioned at a predetermined location that is generally on the axis 29 of the drive shaft 31, and the drive wheel 35 and the endless member 43 are inhibited from unintentionally sliding or moving from the general predetermined location on the side of the driven-side transmission case 23. As a result, the driven-side transmission case 23, the drive wheel 35, the driven wheel 42, the endless member 43 and the regulating member 54 together form a generally unified "assembly body."

Next, the driven-side transmission case 23 as the "assembly body" is mounted onto the drive-side transmission case 22 by the fastener 24, the bracket 25 and the fastener 26. Also, the drive wheel 35 is mounted onto the one end 34 of the drive shaft 31 by means of a spline connection. Next, the drive wheel 35 is affixed to the one end 34 of the drive shaft 31 by the fastener 36. Thus, the assembly work of the "assembly body" to the drive-side transmission case 22 completes. Next, the cover member 56 is mounted onto the driven-side transmission case 23 by the fastener 55.

Once the power transmission device is coupled to the engine, the rear wheel 8 preferably is coupled with the other end 45 of the driven shaft 40 through the interlocking device 46. Afterwards, when the actuator 71 and the operating rod 73 are assembled with the aperture 72 and the cover member 56 by the fastener 70, the assembly work of the power transmission device 11 is completed.

As thus described, because the regulating member 54 prevents the drive wheel 35 from unintentionally dropping off from the driven-side transmission case 23, the drive wheel 35 is more easily mounted onto the end 34 of the drive shaft 31. Thus, the assembly work of the power transmission device 11 can be more easily conducted.

Also, as described above, the respective surfaces 60, 61 of the driven-side transmission case 23 abutting on the regulating member 54 and the cover member 56 are defined generally in the same plane 62. Thus, when the respective surfaces 60, 61 of the driven-side transmission case 23 are machined, the abutting surfaces 60, 61 are not individually formed but can be simultaneously formed in the machining process, and accordingly this shaping can be easily done. A similar advantage is gained with this construction when fabricating the regulating member 54 and the cover member 56. Thus, the machining process can be more easily conducted in comparison with a case where both inside and outside surfaces of the regulating member 54 are machined. The shaping of the power transmission device 11 can be more easily conducted, accordingly.

Also, as described above, the endless member 43 wound around the drive wheel 35 and the driven wheel 42 is provided for power transmission, and the regulating member 54 is positioned to approach an outside surface of the endless member 43 from a location outward of the one end 34 of the drive shaft 31. Thus, when the regulating member 54 is mounted onto the driven-side transmission case 23, at least a portion of the drive wheel 35 and at least a portion of the endless member 43 are positioned so as to be interposed between the outside surface of the driven-side transmission case 23 and the regulating member 54 in the axial direction of the drive shaft 31. In this manner, the drive wheel 35 is positioned at a predetermined location that is generally on the axis 29 of the drive shaft 31. In addition, the drive wheel 35 and the endless member 43 are inhibited from unintentionally dropping off from the predetermined location on the side of the driven-side transmission case 23.

The power transmission device 11 thus can be easily assembled in the process in which the drive wheel 35 is mounted onto the one end 34 of the drive shaft 31 because little or no attention needs to be paid to the position of the drive wheel 35 or to whether the endless member 43 has slipped from its proper position on the drive wheel 35.

Also, as described above, the one portion 58 of the regulating member 54 opposing to the outside surface of the drive wheel 35 is disposed in the area surrounded by the annular endless member 43 in the view along the axis 29 of the drive shaft 31 (FIG. 3). Therefore, the endless member 43 and the regulating member 54 are disposed in a compact manner with respect to each other, and the side-to-side width of the power transmission device 11 thus can be reduced. Also, as described above, because the oil pump 78 is formed using the regulating member 54, the drive wheel 35, the driven wheel 42, the regulating member 54 and the oil pump 78 are disposed in a compact manner with respect to each other. Additionally, the pump drive section 81 of the oil pump 78 is interlockingly coupled with the driven wheel 42 side. These components 42, 78 are thus disposed in a compact manner.

Also, as described above, the pump case 80 has the pump case body 83 mounted onto the driven-side transmission case 23 and the pump cover 85 detachably affixed to the pump case body 80, and the pump chamber 79 is formed between the pump case body 83 and the pump cover 85. Therefore, when the pump drive section 81 undergoes maintenance or inspection work, the cover member 56 is removed from the driven-side transmission case 23 by detaching the fastener 55 and then the pump cover 85 is removed from the pump case body 83 by detaching the fastener 84. These are only required to open the pump chamber 79. The work on the pump drive section 81 that is built in the pump chamber 79 thus can be easily done.

The above description is made in accordance with the figures and in connection with an application on a motorcycle. Thus, the motorcycle can enjoy all of the advantages discussed above in connection with the respective claims, including the effects that the power transmission device can be more easily assembled, that the power transmission device can be more easily formed, and that the power transmission device can be small. However, the power transmission device 11 can be applied to vehicles such as watercrafts and for industrial machines, as noted above. Also, the internal combustion engine 10 can include two stroke engines. Further, the drive wheel 35 and the driven wheel 42 can be gears that engage with each other. In this variation, no endless member is necessary. In addition, the fastener 36 can be a bolt.

Accordingly, although the above-described aspects of the invention have been disclosed in the context of a certain preferred embodiment and examples, it will be understood by those skilled in the art that the present aspects of the invention extend beyond the specifically disclosed embodiments to other alternative embodiments and/or uses of the invention and obvious modifications and equivalents thereof In addition, while several variations of the invention have been shown and described in detail, other modifications, which are within the scope of these inventions, will be readily apparent to those of skill in the art based upon this disclosure. It is also contemplated that various combination or sub-combinations of the specific features and aspects of the embodiment may be made and still fall within the scope of the invention. It should be understood that various features and aspects of the disclosed embodiment can be combined with or substituted for one another in order to form varying modes of the disclosed invention. Thus, it is intended that the scope of at least some of the present invention herein disclosed should not be limited by the particular disclosed embodiment described above.

What is claimed is:

1. A power transmission device comprising:
   a drive-side transmission case;
   a drive shaft being journaled by the drive-side transmission case such that one end of the drive shaft extends beyond the drive-side transmission case;
   a drive wheel mounted onto the one end of the drive shaft,
   a driven-side transmission case being mounted onto the drive-side transmission case and including substantially coplanar first and second abutment surfaces,
   a driven wheel journaled by the driven-side transmission case and arranged so as to be interlockingly coupled with the drive wheel;
   a cover member being mounted onto the driven-side transmission case and being juxtaposed with at least the first abutment surface thereof, the cover member covering said one end of the drive shaft, the drive wheel and the driven wheel from a location on an outer side of the driven-side transmission case; and
   a regulating member being positioned to lie on an outer side surface of the drive wheel and being mounted onto the driven-side transmission case so as to juxtapose at least the second abutment surface thereof, the regulating member being configured to restrict at least axial movement of the drive wheel relative to the driven-side transmission case.

2. The power transmission device set forth in claim 1, additionally comprising an endless member wound around the drive wheel and the driven wheel for power transmission.

3. The power transmission device set forth in claim 2, wherein the regulating member is configured to lie adjacent to and outward of at least one portion of the endless member when mounted onto the driven-side transmission case.

4. The power transmission device set forth in claim 3, wherein a portion of the regulating member opposing to the outside surface of the drive wheel is disposed in a location surrounded by the endless member as viewed in a direction parallel to an axis of the drive shaft.

5. The power transmission device set forth in claim 2 additionally comprising an oil pump including a pump case unitarily formed with the regulating member and having a pump chamber therein, and a pump drive section disposed in the pump chamber and driven by the driven wheel.

6. The power transmission device set forth in claim 4, wherein the pump drive section is coupled to an outer side surface of the driven wheel.

7. The power transmission device set forth in claim 5, wherein the pump case includes a pump case body mounted onto the driven-side transmission case and a pump cover is detachably affixed to the pump case body, and wherein the pump chamber is formed between the pump case body and the pump cover.

8. The power transmission device set forth in claim 4 in combination with a motorcycle having an internal combustion engine and at least one driven wheel, the power transmission device being arranged between the engine and the driven wheel with the engine being coupled to the drive shaft and the driven wheel of the power transmission device being coupled to the driven wheel of the motorcycle.

9. The power transmission device set forth in claim 1 additionally comprising an oil pump including a pump case unitarily formed with the regulating member and having a pump chamber therein, and a pump drive section disposed in the pump chamber and driven by the driven wheel.

10. The power transmission device set forth in claim 9, wherein the pump drive section is coupled to an outer side surface of the driven wheel.

11. The power transmission device set forth in claim 9, wherein the pump case includes a pump case body mounted onto the driven-side transmission case and a pump cover is detachably affixed to the pump case body, and wherein the pump chamber is formed between the pump case body and the pump cover.

12. The power transmission device set forth in claim 9 additionally comprising an endless member wound around the drive wheel and the driven wheel for power transmission; and
   the regulating member being configured to lie adjacent to and outward of at least one portion of the endless member when mounted onto the driven-side transmission case, and being arranged such that a portion of the regulating member, which opposes the outside surface of the drive wheel, is disposed in a location surrounded by the endless member as viewed in a direction parallel to an axis of the drive shaft.

13. The power transmission device set forth in claim 1 in combination with a motorcycle having an internal combustion engine and at least one driven wheel, the power transmission device being arranged between the engine and the driven wheel with the engine being coupled to the drive shaft and the driven wheel of the power transmission device being coupled to the driven wheel of the motorcycle.

14. A method for assembling the power transmission device comprising the steps of:
   coupling a drive-side transmission case with a portion of a drive shaft such that an end of the drive shaft extends beyond an outer side of the drive-side transmission case;
   positioning a drive wheel on a driven-side transmission case;
   coupling together a driven wheel with the driven-side transmission case in a manner journaling the driven wheel;
   mounting a regulating member onto the driven-side transmission case so that the drive wheel is interposed between the driven-side transmission case and the regulating member to restrict movement of the drive wheel at least in the axial direction of the drive shaft;
   mounting the driven-side transmission case onto the drive-side transmission case while positioning the drive wheel on the one end of the drive shaft; and
   attaching the cover member onto the driven-side transmission case.

* * * * *